(12) United States Patent
Lee

(10) Patent No.: US 9,301,324 B2
(45) Date of Patent: Mar. 29, 2016

(54) METHOD AND APPARATUS FOR CONTROLLING NETWORK ACCESS IN A WIRELESS COMMUNICATION SYSTEM

(71) Applicant: LG ELECTRONICS INC., Seoul (KR)

(72) Inventor: Ki-Dong Lee, San Diego, CA (US)

(73) Assignee: LG ELECTRONICS INC., Seoul (KR)

( * ) Notice: Subject to any disclaimer, the term of this patent is extended or adjusted under 35 U.S.C. 154(b) by 47 days.

(21) Appl. No.: 14/357,757

(22) PCT Filed: Nov. 13, 2012

(86) PCT No.: PCT/KR2012/009539
§ 371 (c)(1),
(2) Date: May 12, 2014

(87) PCT Pub. No.: WO2013/073809
PCT Pub. Date: May 23, 2013

(65) Prior Publication Data
US 2014/0301344 A1  Oct. 9, 2014

Related U.S. Application Data

(60) Provisional application No. 61/559,692, filed on Nov. 14, 2011, provisional application No. 61/694,746, filed on Aug. 29, 2012.

(51) Int. Cl.
*H04W 72/04* (2009.01)
*H04W 74/08* (2009.01)
(Continued)

(52) U.S. Cl.
CPC ........ *H04W 74/0833* (2013.01); *H04W 72/042* (2013.01); *H04W 74/0866* (2013.01); *H04W 76/028* (2013.01); *H04W 76/064* (2013.01); *H04W 76/066* (2013.01)

(58) Field of Classification Search
None
See application file for complete search history.

(56) References Cited

U.S. PATENT DOCUMENTS

| 2008/0186892 | A1 | 8/2008 | Damnjanovic | |
| 2008/0194259 | A1* | 8/2008 | Vujcic | H04W 74/0866 455/435.1 |
| 2008/0267126 | A1* | 10/2008 | Vujcic | H04B 7/2637 370/330 |

(Continued)

FOREIGN PATENT DOCUMENTS

EP  2276303  1/2011

OTHER PUBLICATIONS

PCT International Application No. PCT/KR2012/009539, Written Opinion of the International Searching Authority dated Mar. 18, 2013, 10 pages.

*Primary Examiner* — Candal Elpenord
(74) *Attorney, Agent, or Firm* — Lee, Hong, Degerman, Kang & Waimey

(57) ABSTRACT

The present invention is directed to a method and an apparatus for use in a wireless communication system. Specifically, the present invention is directed to a method of performing random access procedure for network access and an apparatus therefore, in which the method comprises: receiving a first downlink signal including first information at time t1, the first information indicating a first time duration T1; receiving a second downlink signal including second information at a time t1+b within T1, the second information indicating a second time duration T2; and performing the random access procedure for network access, wherein if T2 is larger than b, the random access procedure is allowed after T2−b has passed from t1+b, wherein if T2 is equal to or less than b, the random access procedure is allowed after t1+b.

20 Claims, 13 Drawing Sheets

(51) Int. Cl.
*H04W 76/06* (2009.01)
*H04W 76/02* (2009.01)

(56) References Cited

U.S. PATENT DOCUMENTS

| | | | | |
|---|---|---|---|---|
| 2008/0268893 A1* | 10/2008 | Lee | ................... | H04W 52/146 |
| | | | | 455/522 |
| 2009/0052388 A1* | 2/2009 | Kim | ................... | H04W 74/002 |
| | | | | 370/329 |
| 2009/0052391 A1* | 2/2009 | Park | ................... | H04W 28/06 |
| | | | | 370/329 |
| 2010/0074202 A1 | 3/2010 | Park et al. | | |
| 2011/0002289 A1* | 1/2011 | Gerstenberger | .... | H04W 56/003 |
| | | | | 370/329 |
| 2011/0235620 A1 | 9/2011 | Ahn et al. | | |
| 2011/0280199 A1* | 11/2011 | Widell | ................ | H04W 74/085 |
| | | | | 370/329 |
| 2012/0033613 A1* | 2/2012 | Lin | ................... | H04W 74/085 |
| | | | | 370/328 |
| 2012/0039171 A1* | 2/2012 | Yamada | ................. | H04L 47/12 |
| | | | | 370/232 |
| 2014/0036669 A1* | 2/2014 | Yang | ................. | H04N 21/2365 |
| | | | | 370/230 |

* cited by examiner

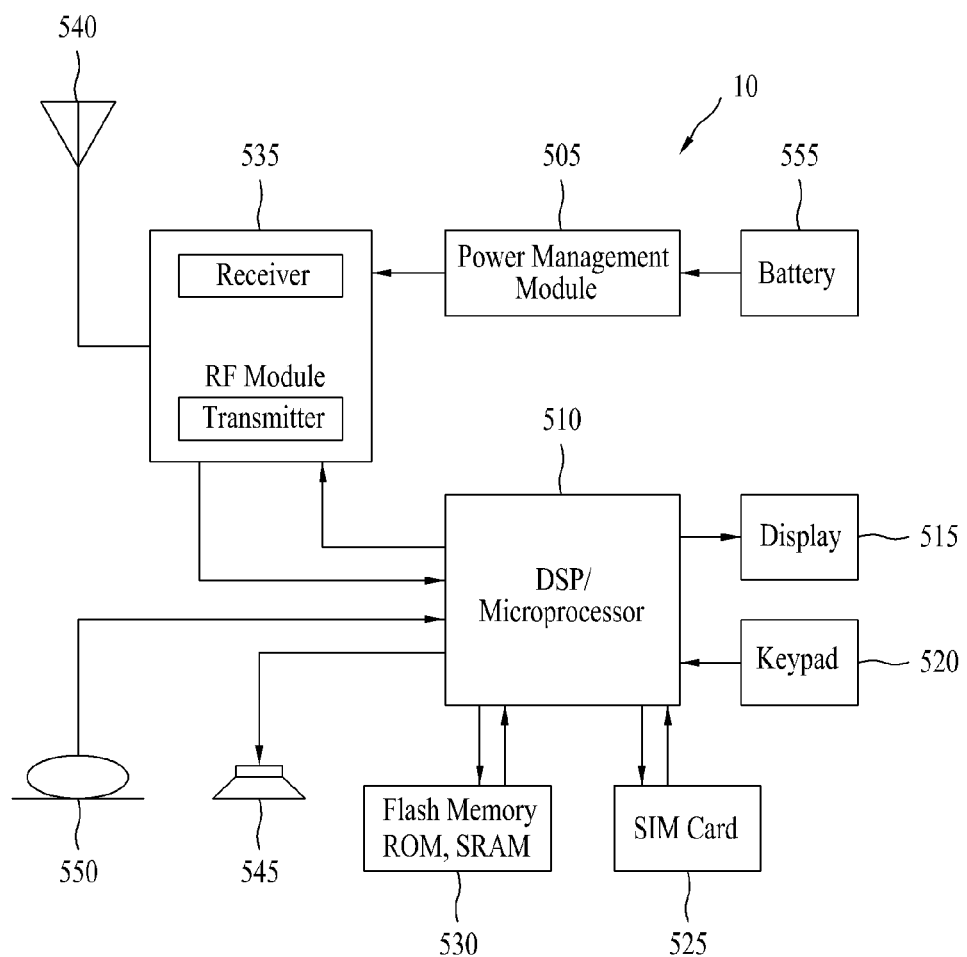

METHOD AND APPARATUS FOR CONTROLLING NETWORK ACCESS IN A WIRELESS COMMUNICATION SYSTEM

CROSS-REFERENCE TO RELATED APPLICATIONS

This application is the National Stage filing under 35 U.S.C. 371 of International Application No. PCT/KR2012/009539, filed on Nov. 13, 2012, which claims the benefit of U.S. Provisional Application Ser. Nos. 61/694,746, filed on Aug. 29, 2012 and 61/559,692, filed on Nov. 14, 2011, the contents of which are all hereby incorporated by reference herein in their entirety.

TECHNICAL FIELD

The present invention is directed to a method and an apparatus for use in a wireless communication system. Specifically, the present invention is directed to a method and an apparatus of controlling network access. The wireless communication system can provide Machine-Type Communication (MTC) services.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system and the like.

DISCLOSURE OF INVENTION

Technical Problem

An object of the present invention is to provide a method and an apparatus of efficiently resolving network access congestion in a wireless communication system. Another object of the present invention is to provide a method and an apparatus of efficiently controlling network access, particularly random access procedure for the network access. The wireless communication system can provide MTC services, and the network congestion/access may be for the MTC services.

It will be appreciated by persons skilled in the art that the objects that can be achieved through the present invention are not limited to what has been particularly described hereinabove and the above and other objects that the present invention can achieve will be more clearly understood from the following detailed description taken in conjunction with the accompanying drawings.

Solution to Problem

As a first aspect of the invention, a method of performing a random access procedure for network access at a User Equipment (UE) in a wireless communication system is provided, in which the method comprises: receiving a first downlink signal including first information at a time t1, the first information indicating a first time duration T1; receiving a second downlink signal including second information at a time t1+b within T1, the second information indicating a second time duration T2; and performing the random access procedure for network access, wherein if T2 is larger than b, the random access procedure is allowed after T2−b has passed from t1+b, wherein if T2 is equal to or less than b, the random access procedure is allowed after t1+b.

As a second aspect of the invention, a User Equipment (UE) configured to perform a random access procedure for network access in a wireless communication system is provided, in which the UE comprises: a radio frequency (RF) unit; and a processor, wherein the processor is configured to: receive a first downlink signal including first information at a time t1, the first information indicating a first time duration T1, receive a second downlink signal including second information at a time t1+b within T1, the second information indicating a second time duration T2, and perform the random access procedure for network access, wherein if T2 is larger than b, the random access procedure is allowed after T2−b has passed from t1+b, wherein if T2 is equal to or less than b, the random access procedure is allowed after t1+b.

Preferably, the first downlink signal includes a message for rejecting a radio resource control (RRC) connection request or a message for releasing a RRC connection.

Preferably, the first downlink signal includes a system information block, and the first information further indicates whether the random access process is allowed or barred during T1 from t1.

Preferably, the network access is for a machine type communication (MTC).

Preferably, the UE is a delay-tolerant device.

As a third aspect of the invention, a method of controlling a random access procedure for network access in a wireless communication system is provided, in which the method comprises: transmitting, by a Base Station (BS), a first signal to a User Equipment (UE) at a time t1, the first signal indicating a first time duration T1; transmitting, by the BS, a second signal to a Mobility Management Entity (MME), the second signal including identification information of the UE; transmitting, by the BS, a third signal to the MME if the BS detects network access congestion relief, the third signal informing the network access congestion relief; receiving, by the BS, a fourth signal from the MME, the fourth signal indicating a second time duration T2 for the UE; and transmitting, by the BS, a fifth signal to the UE at a time t1+b, the fifth signal indicating the second time duration T2, wherein if T2 is larger than b, the UE is allowed to perform the random access procedure after T2−b has passed from t1+b, wherein if T2 is equal to or less than b, the UE is allowed to perform the random access procedure after t1+b.

As a fourth aspect of the invention, a wireless communication system configured to control a random access procedure for network access is provided, in which the wireless communication system comprises: a User Equipment (UE); a Base Station (BS); and a Mobility Management Entity (MME), wherein the BS is configured to: transmit a first signal to a User Equipment (UE) at a time t1, the first signal indicating a first time duration T1, transmit a second signal to the MME, the second signal including identification information of the UE, transmit a third signal to the MME if the BS detects network access congestion relief, the third signal informing the network access congestion relief, receive a fourth signal from the MME, the fourth signal indicating a second time duration T2 for the UE, and transmit a fifth signal to the UE at a time t1+b, the fifth signal indicating the second time duration T2, wherein if T2 is larger than b, the UE is allowed to perform the random access procedure after T2−b has passed from t1+b, wherein if T2 is equal to or less than b, the UE is allowed to perform the random access procedure after t1+b.

Preferably, the first signal includes a message for rejecting a radio resource control (RRC) connection request or a message for releasing a RRC connection.

Preferably, the first signal includes a system information block, and the first signal further indicates whether the random access process is allowed or barred during T1 from t1.

Preferably, the network access is for a machine type communication (MTC).

Preferably, the UE is a delay-tolerant device.

Advantageous Effects of Invention

Exemplary embodiments of the present invention have the following effects. In accordance with the embodiments of the present invention, network access congestion can be efficiently resolved in a wireless communication system. In addition, network access, particularly random access procedure for the network access can be efficiently controlled.

It will be appreciated by persons skilled in the art that the effects that can be achieved through the present invention are not limited to what has been particularly described hereinabove and other advantages of the present invention will be more clearly understood from the following detailed description taken in conjunction with the accompanying drawings.

BRIEF DESCRIPTION OF DRAWINGS

The accompanying drawings, which are included to provide a further understanding of the invention, illustrate embodiments of the invention and together with the description serve to explain the principle of the invention.

FIG. 11 illustrates a block diagram of a UE or Mobile Station (MS).

MODE FOR THE INVENTION

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following embodiments of the present invention can be applied to a variety of wireless access technologies, for example, CDMA, FDMA, TDMA, OFDMA, SC-FDMA, MC-FDMA, and the like. CDMA can be implemented by wireless communication technologies, such as Universal Terrestrial Radio Access (UTRA) or CDMA2000. TDMA can be implemented by wireless communication technologies, for example, Global System for Mobile communications (GSM), General Packet Radio Service (GPRS), Enhanced Data rates for GSM Evolution (EDGE), etc. OFDMA can be implemented by wireless communication technologies, for example, IEEE 802.11 (Wi-Fi), IEEE 802.16 (WiMAX), IEEE 802.20, E-UTRA (Evolved UTRA), and the like. UTRA is a part of the Universal Mobile Telecommunications System (UMTS). 3rd Generation Partnership Project (3GPP) Long Term Evolution (LTE) is a part of Evolved UMTS (E-UMTS) that uses E-UTRA. The LTE? Advanced (LTE-A) is an evolved version of 3GPP LTE. Although the following embodiments of the present invention will hereinafter describe inventive technical characteristics on the basis of the 3GPP LTE/LTE-A system, it should be noted that the following embodiments will be disclosed only for illustrative purposes and the scope and spirit of the present invention are not limited thereto.

Although the following embodiments of the present invention will hereinafter describe inventive technical characteristics on the basis of the 3GPP LTE/LTE-A system, it should be noted that the following embodiments will be disclosed only for illustrative purposes and the scope and spirit of the present invention are not limited thereto. Specific terms used for the exemplary embodiments of the present invention are provided to aid in understanding of the present invention. These specific terms may be replaced with other terms within the scope and spirit of the present invention.

Figure 1:
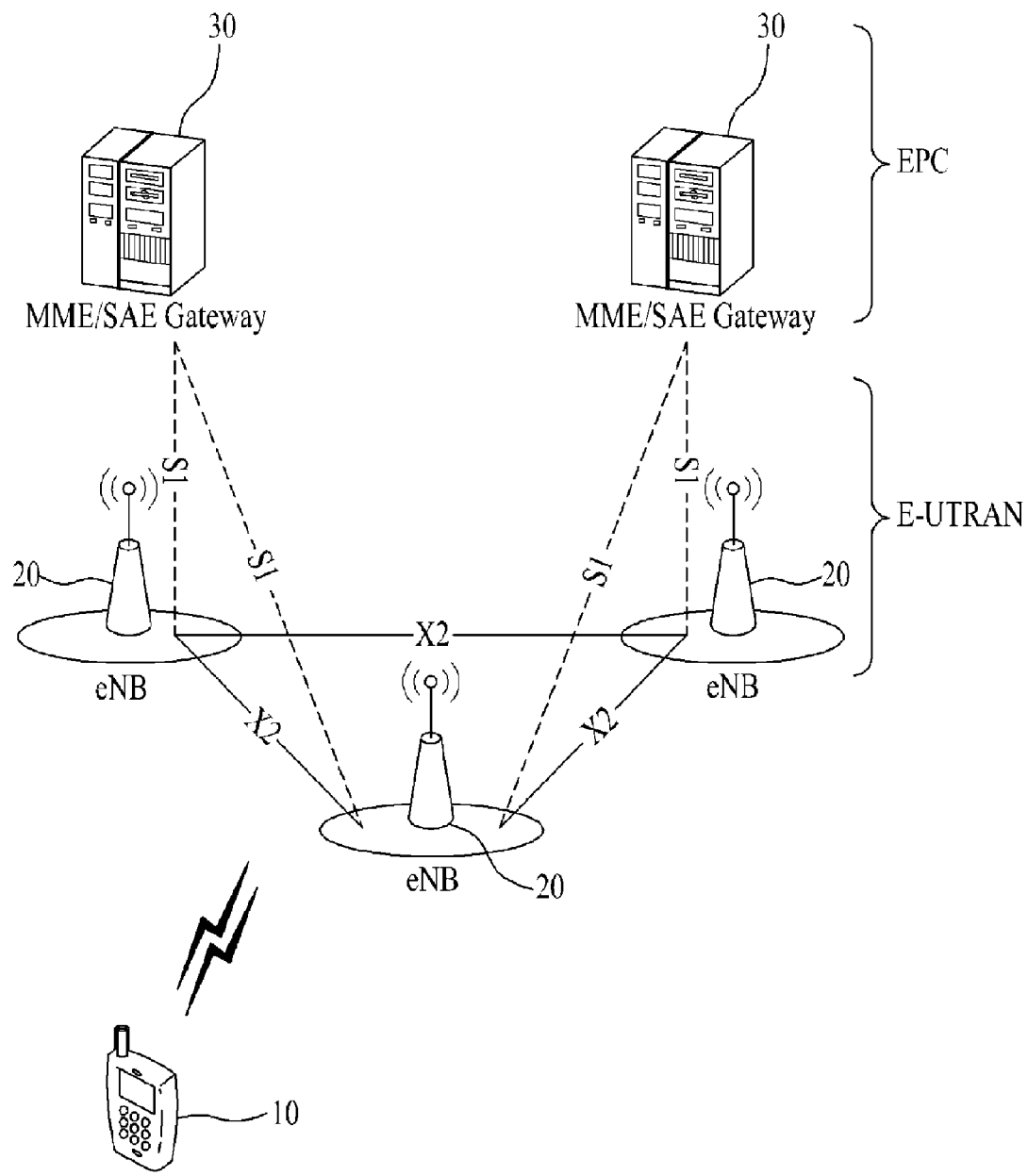
FIG. 1 illustrates a network structure of an Evolved Universal Mobile Telecommunication System (E-UMTS).

FIG. 1 illustrates a network structure of an E-UMTS. The E-UMTS may be also referred to as an LTE system. The E-UMTS is widely deployed to provide a variety of communication services such as voice and packet data, and is generally configured to function based upon the various techniques presented herein and discussed in more detail with regard to later figures.

With reference to FIG. 1, the E-UMTS network includes an Evolved UMTS Terrestrial Radio Access Network (E-UTRAN), an Evolved Packet Core (EPC), and one or more mobile terminals (or User Equipment (UE)) 10. The E-UTRAN includes one or more eNodeBs (eNBs) 20. Regarding the EPC, Mobility Management Entity/System Architecture Evolution (MME/SAE) gateway 30 provides an end point of a session and mobility management function for the UE 10. The eNB 20 and the MME/SAE gateway 30 may be connected via an S1 interface.

The UE 10 is a communication device carried by a user and may also be referred to as a Mobile Station (MS), a User Terminal (UT), a Subscriber Station (SS) or a wireless device. In general, the UE includes a transmitter and processor, among other components, and is configured to operate in accordance with the various techniques presented herein.

The eNB 20 is generally a fixed station that communicates with the UE 10. In addition to being referred to as a base station, the eNB 20 may also be referred to as an access point. An eNB 20 provides end points of a user plane and a control plane to the UE 10. In general, the eNB includes a transmitter and processor, among other components, and is configured to operate in accordance with the various techniques presented herein.

A plurality of UEs 10 may be located in one cell. One eNB 20 is typically deployed per cell. An interface for transmitting user traffic or control traffic may be used between eNBs 20.

Here, "downLink (DL)" refers to communication from the eNB 20 to the UE 10, and "UpLink (UL)" refers to communication from the UE to the eNB.

The MME gateway 30 provides various functions including distribution of paging messages to eNBs 20, security control, idle state mobility control, SAE bearer control, and ciphering and integrity protection of Non-Access Stratum (NAS) signaling. The SAE gateway 30 provides assorted functions including termination of U-plane packets for paging reasons, and switching of the U-plane to support UE mobility.

A plurality of nodes may be connected between eNB 20 and gateway 30 via the S1 interface. The eNBs 20 may be connected to each other via an X2 interface and neighboring eNBs may have a meshed network structure that has the X2 interface.

Figure 2:
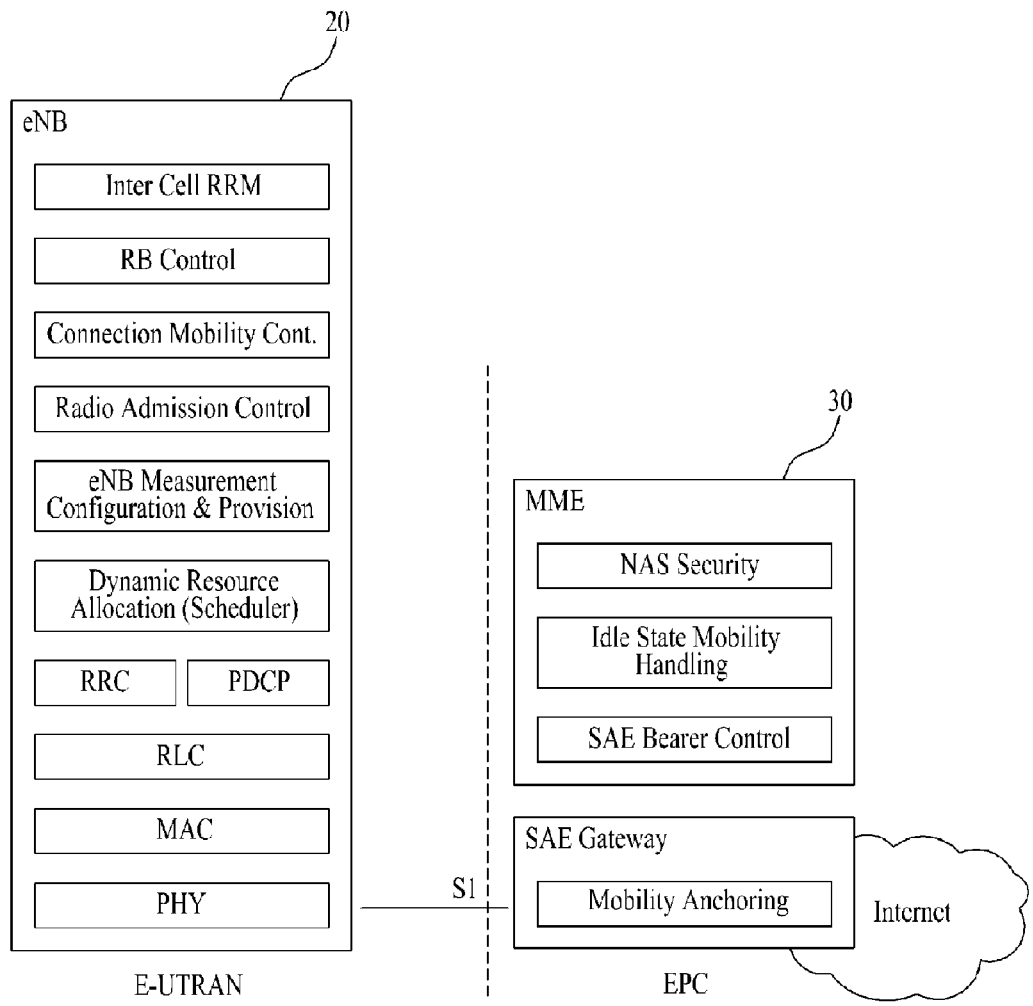
FIG. 2 illustrates a general structure of a typical E-UTRAN and that of a typical Evolved Packet Core (EPC).

FIG. 2 is a block diagram depicting general structures of an E-UTRAN and a EPC. With reference to FIG. 2, eNB 20 may perform functions of selection for MME/SAE gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNB measurements, radio bearer control, Radio Admission Control (RAC), and connection mobility control in LTE_ACTIVE state.

In the EPC, and as described above, MME/SAE gateway 30 may perform functions of paging origination, LTE-IDLE state management, ciphering of the user plane, SAE bearer control, and ciphering and integrity protection of NAS signaling.

Figure 3A:
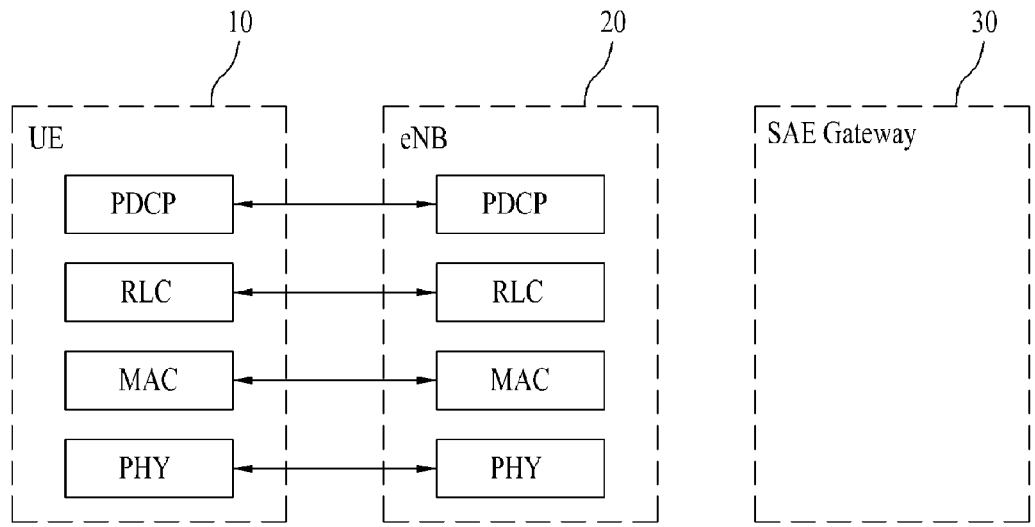
FIGS. 3a~3b illustrate a user-plane protocol and a control-plane protocol stack for the E-UMTS network
Figure 3B:
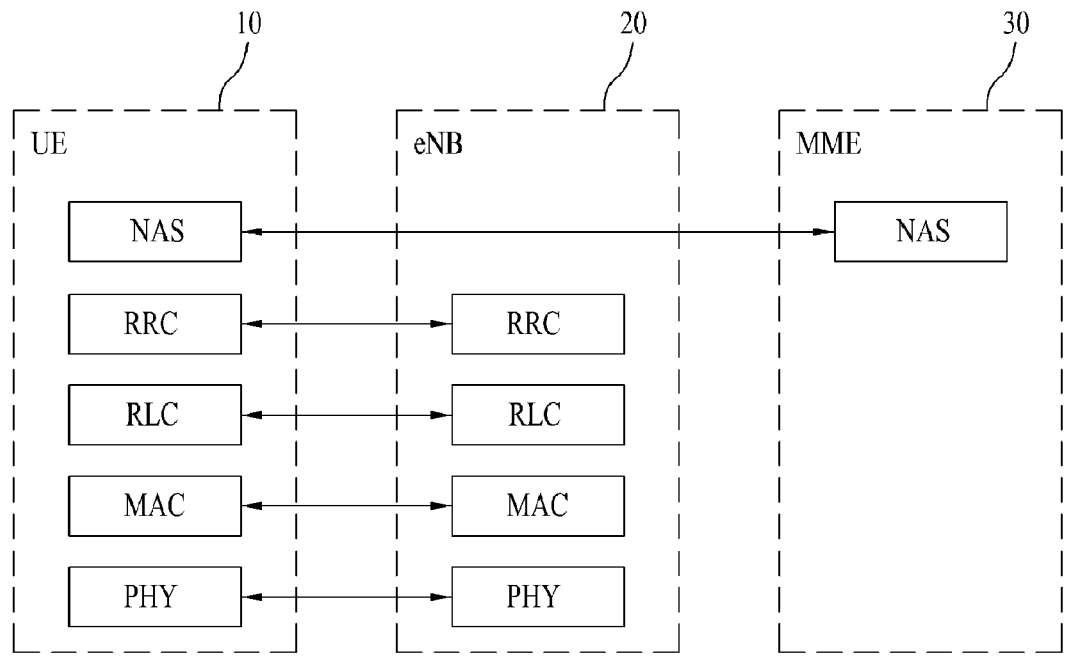

FIGS. 3a~3b illustrate the user-plane protocol and the control-plane protocol stack for the E-UMTS network. With reference to FIGS. 3a~3b, the protocol layers may be divided into a first layer (L1), a second layer (L2) and a third layer (L3) based upon the three lower layers of an Open System Interconnection (OSI) standard model as known in the art of communication systems.

The first layer L1 (or the physical layer) provides an information transmission service to an upper layer using a physical channel. The physical layer is connected with a Medium Access Control (MAC) layer through a transport channel, and data between the MAC layer and the physical layer are transferred via the transport channel. Between different physical layers, namely, between physical layers of a transmission side and a reception side (for example, between physical layers of UE 10 and eNB 20), data are transferred via the physical channel.

The MAC layer of Layer 2 (L2) provides services to a Radio Link Control (RLC) layer via a logical channel. The RLC layer of Layer 2 (L2) supports a reliable transmission of data. Although the RLC layer is shown in FIGS. 3a~3b as being separate from the MAC layer, it is understood that the functions of the RLC layer may be performed by the MAC layer and that, therefore, a separate RLC layer is not required. With reference to FIG. 3a, the Packet Data Convergence Protocol (PDCP) layer of Layer 2 (L2) performs a header compression function that reduces unnecessary control information such that data being transmitted by employing Internet Protocol (IP) packets, such as IPv4 or IPv6, can be efficiently sent over a radio (wireless) interface that has a relatively narrow bandwidth.

With reference to FIG. 3b, a Radio Resource Control (RRC) layer located at the lowest portion of the third layer (L3) is typically only defined in the control plane and controls logical channels, transport channels and the physical channels in relation to the configuration, reconfiguration, and release of the Radio Bearers (RBs). Here, the RB means a service provided by the second layer (L2) for data transmission between the terminal and the E-UTRAN.

With reference to FIG. 3a, the RLC and MAC layers (terminated in an eNB 20 on the network side) may perform functions such as Scheduling, Automatic Repeat reQuest (ARQ), and Hybrid Automatic Repeat reQuest (HARM). The PDCP layer (terminated in eNB 20 on the network side) may perform the user plane functions such as header compression, integrity protection, and ciphering.

With reference to FIG. 3b, the RLC and MAC layers (terminated in an eNB 20 on the network side) perform the same or similar functions as for the control plane. The RRC layer (terminated in an eNB 20 on the network side) may perform functions such as broadcasting, paging, RRC connection management, RB control, mobility functions, and UE measurement reporting and controlling. The NAS control protocol (terminated in the MME 30 on the network side) may perform functions such as a SAE bearer management, authentication, LTE_IDLE mobility handling, paging origination in LTE_IDLE, and security control for the signaling between the gateway and UE 10.

The NAS control protocol may use three different states: first, a LTE_DETACHED state if there is no RRC entity; second, a LTE_IDLE state if there is no RRC connection while storing minimal UE information; and third, an LTE_ACTIVE state if the RRC connection is established.

Thus RRC state may be divided into two different states such as an RRC_IDLE state and an RRC_CONNECTED state. In the RRC_IDLE state, the UE 10 may receive broadcasts of system information and paging information while the UE specifies a Discontinuous Reception (DRX) configured by NAS, and the UE has been allocated an identification (ID) (e.g., System Architecture Evolution—Temporary Mobile Subscriber Identity (S-TMSI)) which uniquely identifies the UE in a tracking area. Also, in the RRC-IDLE state, no RRC context is stored in the eNB.

In the RRC_IDLE state, the UE 10 specifies the paging DRX (Discontinuous Reception) cycle. Specifically, the UE 10 monitors a paging signal at a specific paging occasion of every UE specific paging DRX cycle.

In the RRC_CONNECTED state, the UE 10 has an E-UTRAN RRC connection and a RRC context is stored in the E-UTRAN, such that transmitting and/or receiving data to/from the network (eNB) becomes possible. Also, the UE 10 can report channel quality information and feedback information to the eNB.

In RRC_CONNECTED state, the E-UTRAN knows the cell to which the UE 10 belongs. Therefore, the network can transmit and/or receive data to/from UE 10, the network can control mobility (handover) of the UE.

Figure 4:
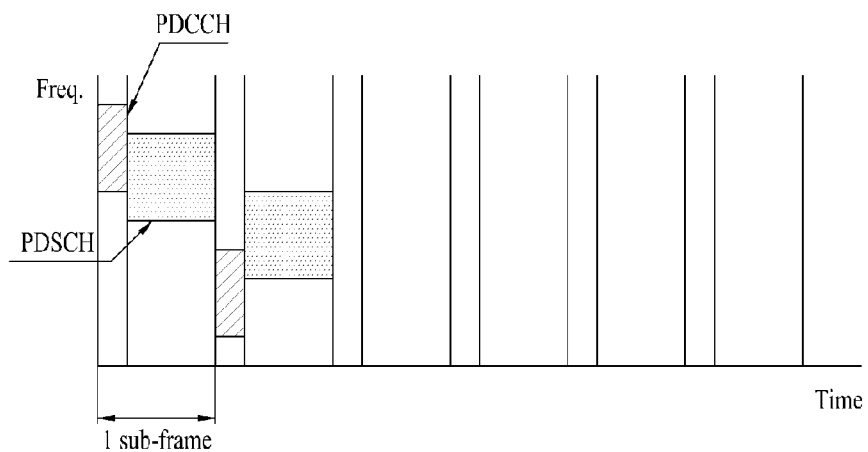
FIG. 4 illustrates a downlink subframe and physical channels.

FIG. 4 illustrates a downlink subframe and physical channels.

With reference to FIG. 4, the downlink subframe includes a plurality of slots (e.g., two). The number of OFDM symbols included in one slot may be changed according to the length of a Cyclic Prefix (CP). For example, in case of a normal CP, the slot may include seven OFDM symbols. The downlink subframe is divided into a data region and a control region in a time domain. A maximum of three (or four) OFDM symbols located in the front part of a first slot of the subframe may correspond to a control region to which a control channel is allocated. The remaining OFDM symbols correspond to a data region to which a Physical Downlink Shared Channel (PDSCH) is allocated. A variety of downlink control channels may be used in LTE(-A), for example, a Physical Control Format Indicator Channel (PCFICH), a Physical Downlink Control Channel (PDCCH), a Physical hybrid ARQ indicator Channel (PHICH), etc. The PCFICH is transmitted on the first OFDM symbol of the subframe, and carries information about the number of OFDM symbols used for transmitting control channels within the subframe. The PHICH carries a Hybrid Automatic Repeat reQuest Acknowledgment/Negative-Acknowledgment (HARQ ACK/NACK) signal as a response to an uplink transmission signal.

Control information transmitted over a PDCCH is referred to as Downlink Control Information (DCI). DCI includes resource allocation information for either a UE or a UE group and other control information. For example, DCI includes UL/DL scheduling information, an UL transmission (Tx) power control command, etc.

The PDCCH carries a variety of information, for example, transmission format and resource allocation information of a DownLink Shared Channel (DL-SCH), transmission format and resource allocation information of an UpLink Shared Channel (UL-SCH), paging information transmitted over a Paging Channel (PCH), system information transmitted over the DL-SCH, resource allocation information of an upper-layer control message such as a random access response transmitted over PDSCH, a set of Tx power control commands of each UE contained in a UE group, a Tx power control command, activation indication information of Voice over IP (VoIP), and the like. A plurality of PDCCHs may be transmitted within a control region. A UE can monitor a plurality of PDCCHs. A PDCCH is transmitted as an aggregate of one or more contiguous Control Channel Elements (CCEs). The CCE is a logical allocation unit that is used to provide a coding rate based on a radio channel state to a PDCCH. The CCE may correspond to a plurality of Resource Element Groups (REGs). The format of PDCCH and the number of PDCCH bits may be determined according to the number of CCEs. A Base Station (BS) decides a PDCCH format according to DCI to be sent to the UE, and adds a Cyclic Redundancy Check (CRC) to control information. The CRC is masked with an identifier (e.g., Radio Network Temporary Identifier (RNTI)) according to a PDCCH owner or a purpose of the PDCCH. For example, provided that the PDCCH is provided for a specific UE, a CRC may be masked with an identifier of the corresponding UE (e.g., cell-RNTI (C-RNTI)). If PDCCH is provided for a paging message, a CRC may be masked with a paging identifier (e.g., Paging-RNTI (P-RNTI)). If a PDCCH is provided for system information (e.g., System Information Block (SIB)), a CRC may be masked with system Information RNTI (SI-RNTI). If PDCCH is provided for a random access response, a CRC may be masked with Random Access-RNTI (RA-RNTI). For example, CRC masking (or scrambling) may be performed using an exclusive OR (XOR) operation between CRC and RNTI at a bit level.

Random Access (RA) Procedure

To initiate access to the network, a random access procedure is used. The random access procedure is also referred to as a Random Access Channel (RACH) procedure. Physical Random Access Channel (PRACH) transmission is under control of higher layer protocol which performs some important functions related to priority and load control. The PRACH is a common physical channel dedicated to the random access procedure. There are two kinds of RACH procedures: contention-based RACH procedure and non-contention-based RACH procedure. In the contention-based RACH procedure, many UEs can attempt to access the same base station simultaneously using same RACH preamble/resources, which may lead to network access congestions/collisions. Hereinafter, unless mentioned otherwise, a RACH (or RA) procedure means a contention-based RACH (or RA) procedure.

A RACH procedure can be used for several purposes. For example the RACH procedure can be used to access the network, to request resources, to carry control information, to adjust the time offset of the uplink in order to obtain uplink synchronization, to adjust the transmitted power, etc.

A RACH procedure can be initiated by the UE or the eNB. The RACH procedure may, for instance, be triggered by the following events:

A UE switches from power-off to power-on and needs to be registered to the network.

A UE is not time-synchronized with a eNB and starts transmitting data (for instance the user calls).

An eNB starts transmitting data to the UE but they are not synchronized (for instance the user receives a call).

An eNB measures a delay of the received signal from the UE (for instance the user is moving and has lost synchronization).

Figure 5:
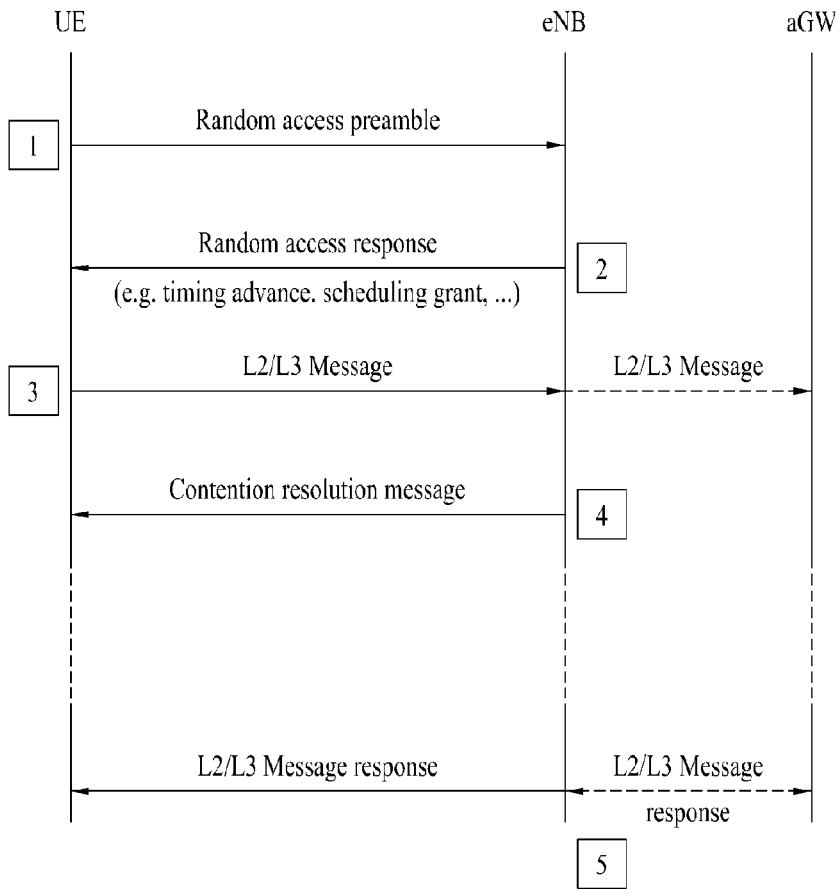
FIG. 5 illustrates a contention-based Random Access (RA) procedure.

FIG. 5 illustrates a contention-based random access procedure.

With reference to FIG. 5, firstly the UE retrieves information transmitted periodically from eNB on a downlink Broadcast Channel (BCH) and selects a preamble signature (e.g., Constant Amplitude Zero Auto-Correlation (CAZAC) sequence), a RACH time slot and a frequency band. The preamble signature is chosen by the UE from among a set of signatures known by the eNB. The UE generates a random access preamble (message 1, box 1) containing the chosen signature and transmits it to the eNB over the selected time slot at the selected frequency. The random access preamble is sent before a RACH connection request and indicates that the UE is about to transmit data. During the random access procedure, several UEs may share the same RACH channel (i.e., PRACH) and they are distinguished by preamble signatures. Congestions/collisions occur whenever several UEs choose the same signature and send it within the same time and frequency resources.

The eNB monitors the current RACH slot in an attempt to detect preambles transmitted from UEs in a corresponding cell. On reception of a signal, the eNB correlates the received signal in the RACH subframe with all possible signatures. Detection of the preamble can be either performed in the time domain or in the frequency domain. A detection variable is computed for each signature. If the detection variable exceeds a certain threshold, the preamble is considered detected.

The eNB sends a random access response (message 2, box 2) to acknowledge the successfully detected preambles. The random access response is sent via a downlink shared channel and includes the detected signature. The random access response also contains a timing advance command, a power-control command.

If the UE receives a random access response from the eNB, the UE decodes the random access response and adapts UL transmission timing, and UL transmission power if the random access response contains power control information. The UE then sends a resource request message (message 3, box 3) via an uplink shared channel. In the message 3, the UE requests bandwidth and time resources to transmit data and it also indicates a UE-specific identifier. When the UE requests resources, the UE uses a specific ID in the message 3 to resolve contentions. Then the UE monitors a specified downlink channel for response from the eNB. In the case of a positive resource grant, the subsequent transmissions are carried out as normal.

The eNB attempts to resolve any contentions. If the eNB receives a resource request with a UE-specific signature, the eNB checks how many UEs were detected with the same signature and resolves any possible contentions. If the preamble sent by a UE was in collision with a preamble from another UE, the eNB sends a contention resolution message (message 4, box 4) to command a corresponding UE to restart the RACH procedure. If the UE was not in collision, the eNB sends a resource assignment message (message 5, box 5). Subsequent transmissions are carried out as usual.

Machine-Type Communication (MTC)

It is expected that there is a market for Machine-Type Communication (MTC) services using the currently available wireless network. In particular, it is possible to identify potential applications for mass Machine-to-Machine (M2M) service: for example, manufacturers could keep in touch with their products after they are shipped. Another example is a home application service where heating and air condition, alarm systems and other applications can be remotely maintained.

Current communication system has been optimally designed for human-to-human (H2H) communication service, thus it may be suboptimal for M2M service. Thus communication system designed for M2M service needs to be investigated.

In order to help understanding, abbreviations, functional entities and interfaces for MTC or M2M service are defined as follows:

MTC: Machine-Type Communications. MTC service is generally delay-tolerant, thus MTC service is also referred to as delay-tolerant service.

MTC device: An entity (e.g., UE) equipped with MTC functions. MTC device can communicate with MTC server(s) and/or other MTC device(s) through a Public Land Mobile Network (PLMN). MTC device and M2M device are interchangeably used. As mentioned above, MTC service is generally delay-tolerant, thus MTC device is also referred to as a delay-tolerant device.

MTC server: An entity that communicates with the PLMN itself, and with MTC devices through the PLMN. MTC server has an interface which can be accessed by MTC user. MTC server provides services for MTC user.

MTC user: A MTC device that uses services provided by the MTC server.

MTC subscriber: A MTC device having a contractual relationship with a network operator for a specific service(s).

MTCu: An interface (or reference point) that MTC device uses to access to the 3GPP network for transport of user plane and control plane traffic. MTCu could be based on Uu, Um, Ww and LTE-Uu interface.

MTCi: An interface (or reference point) that MTC server uses to connect to the 3GPP network and then communicate with MTC device via 3GPP bearer services/IMS. MTCi could be based on Gi, Sgi, and Wi interface.

MTCsms: An interface (or reference point) that MTC server uses to connect to the 3GPP network and then communicate with MTC device via 3GPP SMS.

Figure 6:
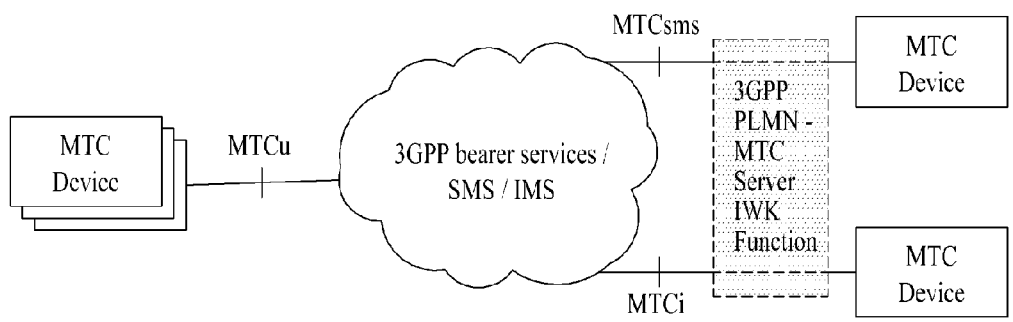
FIGS. 6~7 illustrate Machine-Type Communication (MTC) service models.
Figure 7:
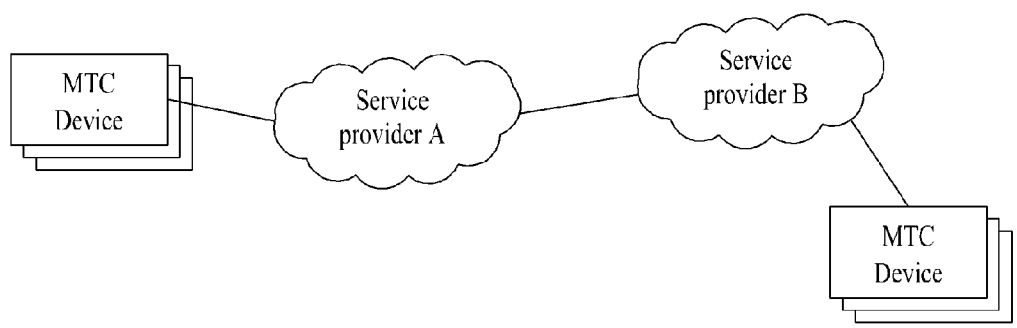

FIG. 6 illustrates a MTC service model where a MTC device communicates with a MTC server(s). FIG. 7 illustrates a MTC service model where a MTC device communicates with other MTC device(s). For easy understanding, FIGS. 6~7 show 3GPP-based service model but the present invention is not limited to the 3GPP communication system.

With reference to FIGS. 6~7, the 3GPP system can provide transport and communication services (including 3GPP bearer services, IP Multimedia Subsystem (IMS) and Short Message Service (SMS)) optimized for the MTC. A MTC device can connect to the 3GPP network (UTRAN, E-UTRAN, GERAN, I-WLAN, etc.) via MTCu interface. The MTC device can communicate with a MTC Server (FIG. 6) or other MTC device(s) (FIG. 7) using the 3GPP bearer services, SMS and IMS provided by the PLMN. The MTC Server connects to the 3GPP network via MTCi/MTCsms interfaces and then communicates with MTC Devices. The MTC Server may be an entity outside of the operator domain (not shown) or inside an operator domain (FIG. 6). Similarly, other MTC device(s) may be an entity outside of the operator domain (FIG. 7) or inside an operator domain (not shown).

Example: Congestion Control in MTC

Comparing with the H2H services, a cell or a base station may have to manage and provide services with significantly large number of MTC devices for MTC services. Such a large number MTC devices may cause a heavy congestion (spikes or surge of traffic) in RACH procedure, thereby required quality of service could not be guaranteed.

In order to address above problem, the Radio Access Network (RAN) of 3GPP is on the way to develop mechanisms to handle the overload efficiently.

And, in RAN Working Group (WG2), following mechanisms have been chosen:

Extended Access Barring (EAB): bitmap notification for Access Class (AC) 0 through AC 9. If EAB is configured (e.g., corresponding AC status is configured as "barred"), network access of a corresponding UE is allowed only when a wait time (or a delay time) expires and AC status is changed to "not-barred".

Extended Wait Time (eWaitTime): network access is not allowed during a wait time (or a delay time) (i.e., eWaitTime). UE can attempt a new network access only after the wait time expires.

Both mechanisms would distribute RA load of delay-tolerant devices over the time by barring (or delaying) RA procedure for a wait time (or a delay time or a barring time): e.g., 900-1800 sec for eWaitTime, and multiple of "modification period" for EAB. In EAB, the wait time can be defined and broadcast by the network (e.g., eNB).

Particularly, eWaitTime may be provided when the network rejects a RRC connection request or releases a previously established RRC connection. The RRC connection request is performed using the message 3 as a part of RA procedure.

Table 1 illustrates a part of the RRCConnectionReject message. Table 2 illustrates a part of the RRCConnectionRelease message.

TABLE 1

```
-- ASN1START
RRCConnectionReject ::=          SEQUENCE {
    criticalExtensions               CHOICE {
        c1                               CHOICE {
            rrcConnectionReject-r8           RRCConnectionReject-r8-1Es,
            spare3 NULL, spare2 NULL, spare1 NULL
    },
```

TABLE 1-continued

```
        criticalExtensionsFuture        SEQUENCE ( )
    }
}
RRCConnectionReject-v1020-1Es ::-   SEQUENCE (
    extendedWaitTime-r10                INTEGER (1..1800)   OPTIONAL,   -- Need ON
    nonCriticalExtension                SEQUENCE ( )        OPTIONAL    -- Need OP
}
-- ASN1STOP
```

TABLE 2

```
-- ASN1START
RRCConnectionRelease ::-            SEQUENCE {
    rrc-Transactionidentifier           RRC-TransactionIdentifier,
    criticalExtensions                  CHOICE {
        c1                                  CHOICE |
            rrcConnectionRelease-r8             RRCConnectionRelease-r8-1Es,
            spare3 NULL, spare2 NULL, spare1 NULL
        },
        criticalExtensionsFuture        SEQUENCE ( )
    }
}
RRCConnectionRelease-v1020-1Es ::-  SEQUENCE |
    extendedWaitTime-r10                INTEGER (1..1800)   OPTIONAL,   -- Need ON
    nonCriticalExtension                SEQUENCE ( )        OPTIONAL    -- Need OP
}
```

When a UE receives a wait time via the EAB or the eWaitTime from the network, the UE runs a timer for the wait time and cannot perform a new RA procedure while the timer is running. In prior arts, it is noted that the timer for RA procedure is not retracted nor stopped at all even if the UE receives an updated wait time before the timer expires. Thus, the updated wait time can be applied only after the timer expires. This is because it is generally recognized that reducing a collision probability is much advantageous/important in efficient resource utilization.

However according to some simulation results based on the traffic model given in 3GPP Technical Report (TR) 37.868 v1.0.0, the present invention noticed that access delay of 90% is not greater than 200 sec. That is, the EAB related "barring time" (which is to be defined possibly) or the eWaitTime is a relatively longer time period than the above-mentioned delay measurement. Thus, the network congestion situation may change while the timer is still running (i.e., still valid). In the event that network congestion level has changed, if a UE which needs to perform RA should still wait as mentioned above because the timer is still running, it is unnecessary action.

In order to address at least one of the aforementioned problems and to resolve network access congestion and improve a RA procedure for network access. In particular, the present invention proposes to adaptively stop an ongoing timer in accordance with a network congestion level; thereby access delay can be reduced. Here, the timer includes a timer for delaying RA procedure. The timer is referred in a various way such as an EAB timer, eWT timer, a wait timer, a barring timer, a delay timer, a timer X and the like, and all these terms can be interchanged. The UE includes a MTC device or a delay-tolerant device.

Hereinafter, with reference to FIGS. 8~11, detailed explanations on the present invention will be described. For easy understanding, below drawings show current operations and proposed operations together, if possible. Some explanations are made only in view of a UE side or an eNB side, but it is noted that corresponding operations are also performed in the other side.

Figure 8A:
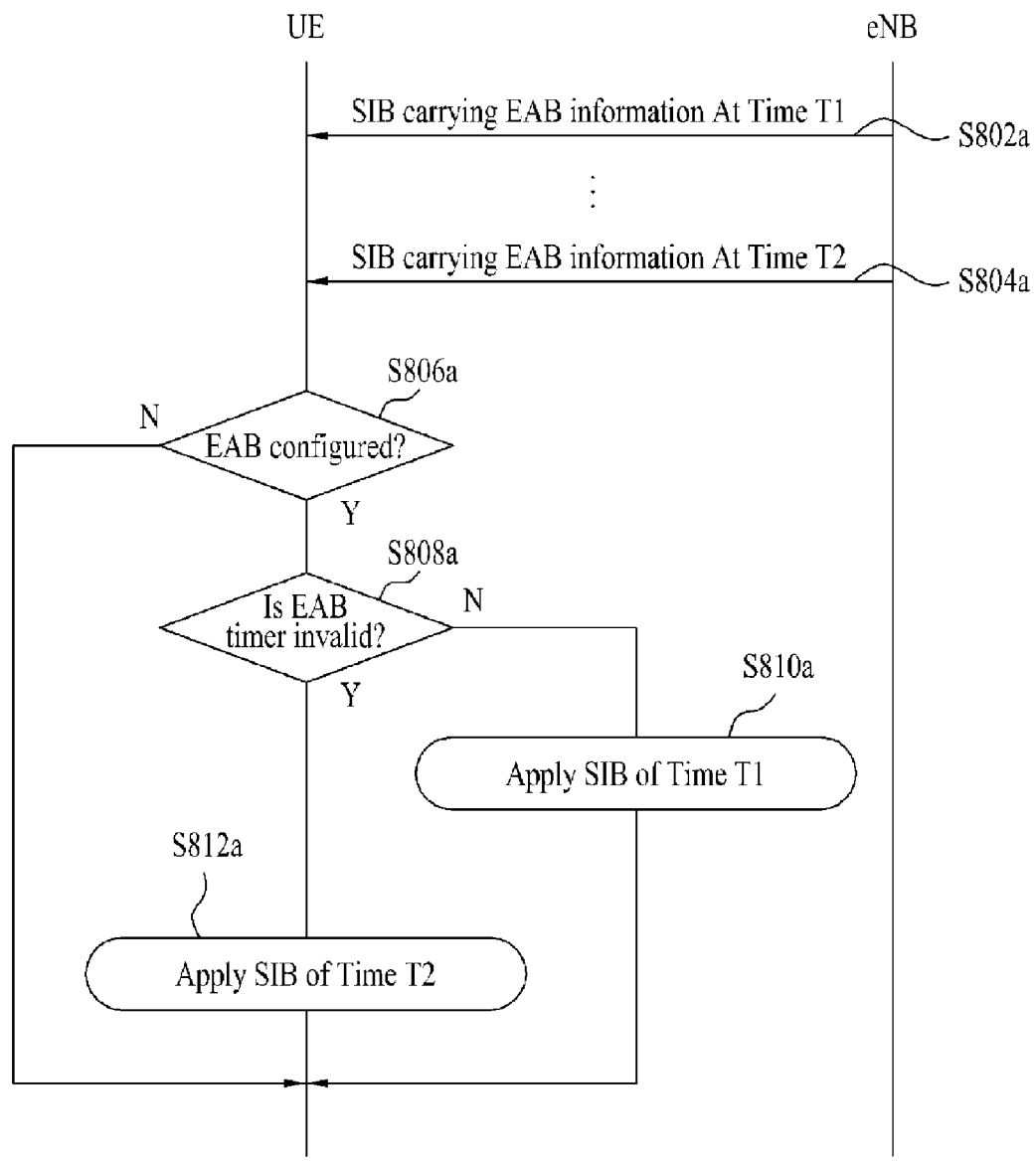
FIGS. 8a~8b illustrate congestion control using Extended Access Barring (EAB).
Figure 8B:
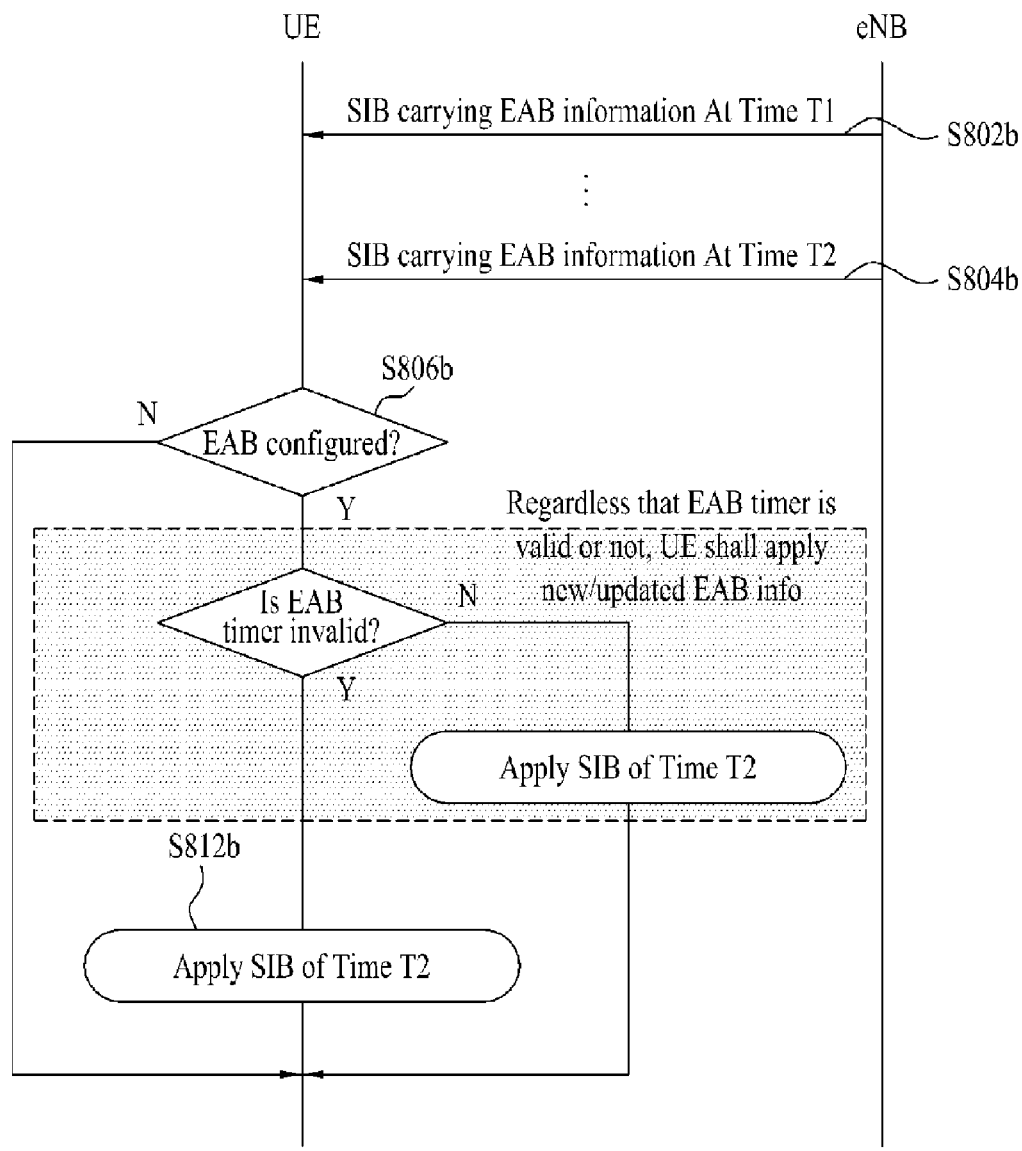

FIGS. 8a~8b illustrate congestion control using EAB (or eWaitTime). FIG. 8a shows a current scheme and FIG. 8b shows a proposed scheme.

With reference to FIG. 8a, a network (e.g., eNB) broadcasts EAB information (or eWaitTime-related information) via SIB at time t1 (S802a). EAB information and/or eWaitTime-related information may be transmitted only to a specific UE via paging (not shown). EAB information and/or eWaitTime-related information include at least one of information indicating congestion level status/change and information indicating a time duration (i.e., wait time) which is related to Core Network (CN) congestion control. The time duration is used to setup an EAB timer. If EAB is configured (e.g., corresponding AC status is configured as "barred"), the UE setup the EAB timer in accordance with the SIB of time t1 and runs the EAB timer.

Then, the network transmits new/changed EAB information (or eWaitTime-related information) via SIB or paging at time t2 (S804a). If UE receives new/changed EAB information (or eWaitTime-related information), UE may check whether the EAB is configured (S806a), and whether the EAB timer is valid (S808a). If the EAB timer is valid (i.e., runs), the UE may apply SIB of time t1 (S810a) or wait. Meanwhile, if the EAB timer is invalid (i.e., expires), the UE may apply SIB of time t2 (S812a). For example, the UE may setup the EAB timer in accordance with the SIB of time t2 and runs the EAB timer again. That is, no update/change is applied while the EAB timer is running, and the update/change can be applied only after the EAB timer expires.

With reference to FIG. 8b, most operations are similar to those of FIG. 8a, and thus detailed explanations could refer to those of FIG. 8a. In particular, S802b, S804b, S806b and S812b are corresponding to S802a, S804a, S806a and S812a. Here, differences between the current scheme and the proposed scheme are focused on. As mentioned above, in the current scheme, even if the UE receives updated/changed EAB information (and/or eWaitTime-related information), no update/change is applied while the EAB timer is running. However, in the proposed scheme, the UE may apply the updated/changed EAB information (and/or eWaitTime-related information) to its RA procedure even if the EAB timer is still valid (dotted box), by shall stopping/disregarding the ongoing EAB timer. Namely, the UE shall act so that updated/changed EAB information (and/or eWaitTime-related information) has priority over the ongoing EAB timer previously set by the network. Here, "EAB timer" is an arbitrary defined term, thus it may be replaced with another equivalent term.

Figure 9A:
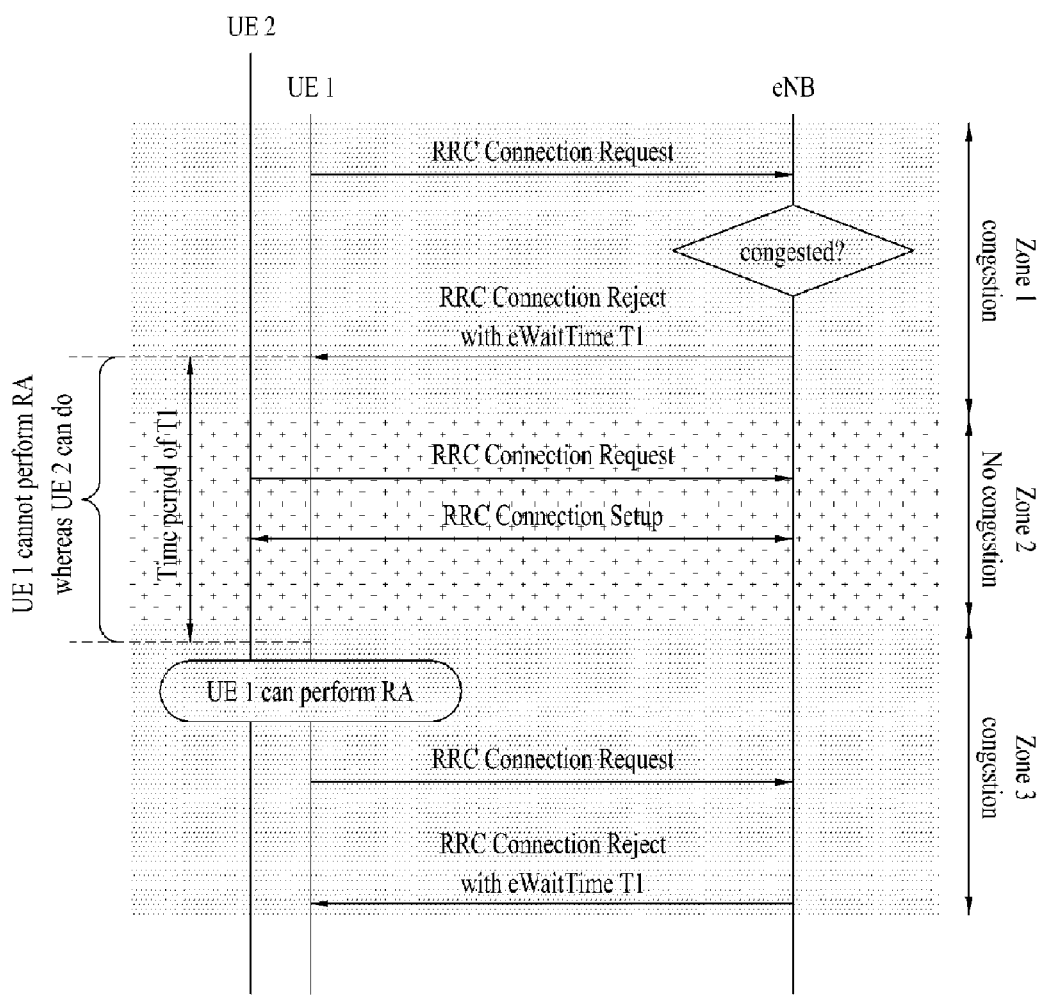
FIGS. 9a~9d illustrate congestion control using Extended Wait Time (eWaitTime).
Figure 9B:
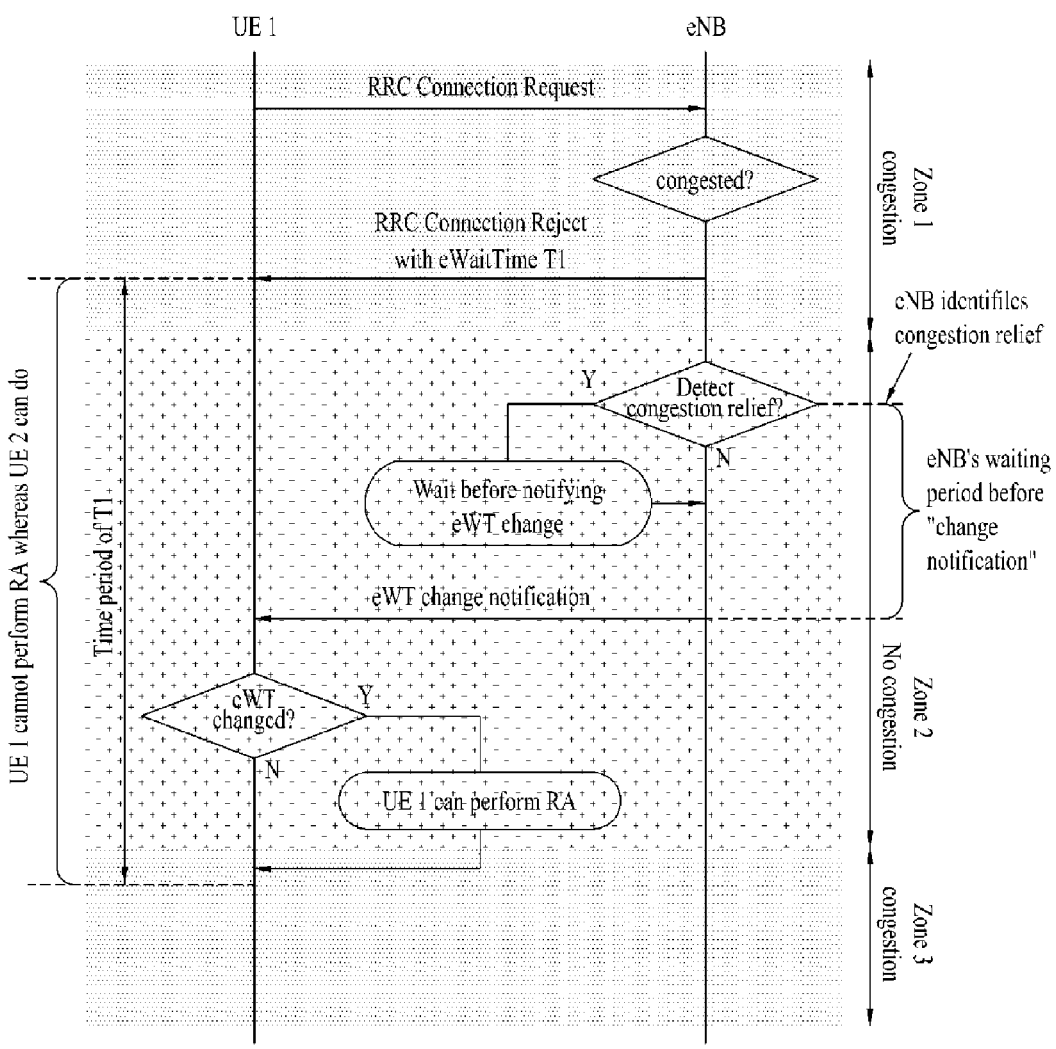
Figure 9C:
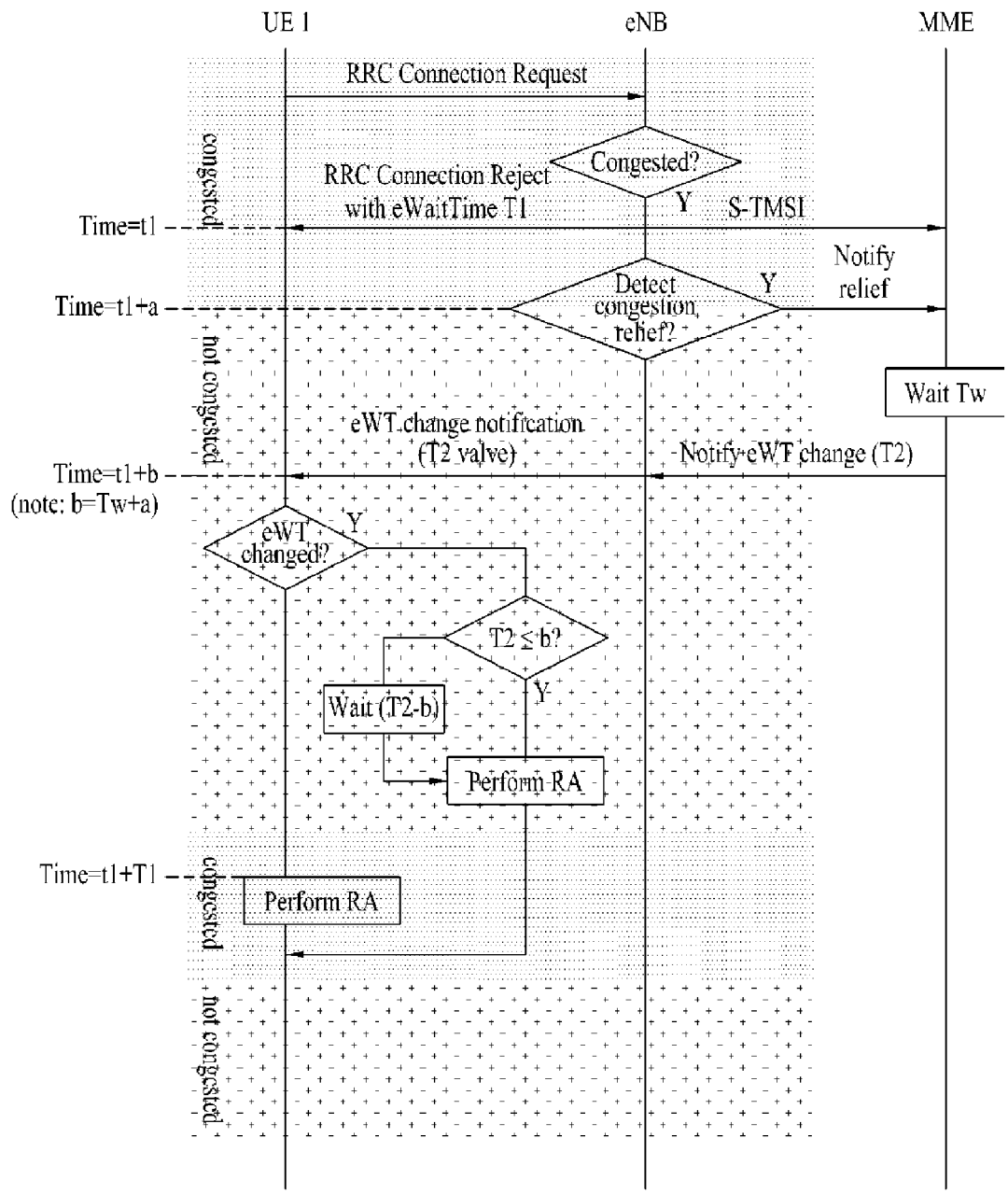
Figure 9D:
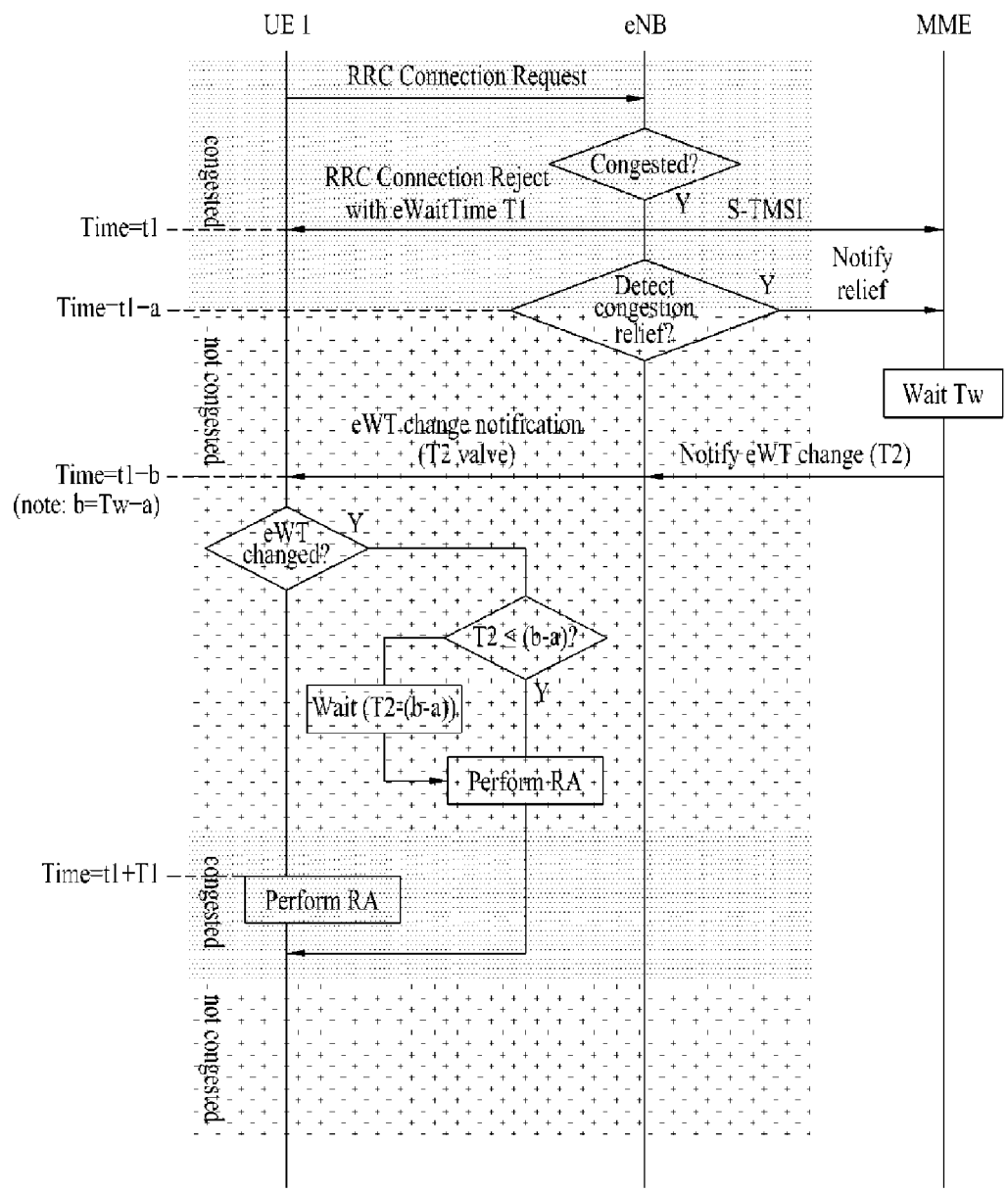

FIGS. 9a~9d illustrate congestion control using eWaitTime (eWT) (or EAB). FIG. 9a shows a current scheme and FIG. 9b~9d show proposed schemes. In FIGS. 9a~9d, RRC connection reject message can be replaced with RRC connection release message.

With reference to FIG. 9a, UE 1 transmits RRC connection request message to an eNB as a part of RA procedure (Zone 1). Since Zone 1 is in congestion, the eNB transmits RRC connection reject message including eWT T1 (Zone 1). For explanation, it is assumed that the congestion is relived within T1 (Zone 2). In this case, even if the congestion is relieved, UE 1 should wait for T1 before it can attempt a new RA. However another device (e.g., UE 2) can attempt RA in Zone 2 and success in network access. As a result, since UE 1 has received a relatively longer eWT, it misses good chances to attempt RA (i.e., Zone 2 where the congestion level is low). In addition, UE 1 may re-attempt according to the eWT T1 in another congested Zone 3, which may cause repetitive network access failure/delay.

With reference to FIG. 9b, most operations are similar to those of FIG. 9a, and thus detailed explanations could refer to those of FIG. 9a. Here, differences between the current scheme and the proposed scheme are focused on. As shown in FIG. 9a, in the current scheme, the network (e.g., eNB) does not need to check whether the congestion is relieved after transmitting the RRC connection rejecting message including eWT. However, in the proposed scheme, the network (e.g., eNB) may detect whether/when congestion level is changed, particularly may check whether/when the congestion is relieved. If the eNB detects congestion level changes, it can transmit an eWT change notification so that the receiving UE(s) (e.g., UE 1) can nullify the ongoing timer and attempt the RA in accordance with the eWT change notification. The eWT change notification may indicate an updated/changed eWT. In this case, UE 1 may set-up an eWT timer in consideration of the updated/changed eWT. For the timer set-up, detailed explanation will be provided with reference to FIGS. 9c~9d. Alternatively, the eWT change notification may indicate a fact itself that the congestion level is changed or the congestion is relieved. That is, the eWT change notification may carry 1-bit information. In this case, when UE 1 receives the eWT change notification, it can nullify the ongoing timer and attempt the RA without further waiting. Therefore the eNB can adaptively control RA loads in consideration of actual congestion levels, and the UE can attempt nullify an ongoing timer and perform a RA procedure. Since network congestion situation changes fast, the eNB can transmit eWT change notification after low congestion situation is maintained for a certain time period when the eNB detects congestion level changes. With this, the eNB can provide more stable change notification information.

With reference to FIGS. 9c~9d, as mentioned above, these examples assume the cases that the eWT change notification indicates an eWT (e.g., T2). As an implementation, FIGS. 9c~9d further include interactions between an eNB and a MME. In particular, the eNB transmits, to the MME, a signal including unique identification information (e.g., S-TMSI) of UE 1. S-TMSI is a unique identifier assigned to UE by the MME in order to identify UE context. In addition, the eNB transmits a signal for notifying the MME that congestion level is changed or congestion relief is detected. In this case, preferably after waiting Tw for more stable information, the MME may transmit, to the eNB, a signal including information related with eWT change (e.g., eWT value T2), and commands the eNB to transmit the information related with eWT change to UE 1 using a paging. For this, the MME may inform the eNB of UE 1's S-TMSI. Information related with eWT change, which is provided by the MME, can be unicast from the eNB to UE 1 via a paging message. Information related with eWT change may include updated/changed eWT value. FIGS. 9c~9d exemplifies the cases that the MME notifies eWT change, but it is also possible for eNB to notify UEs of information related with eWT change, without assistance of the MME. Only, eNB does not know presence of RRC_IDLE UEs, and thus information related with eWT change can be broadcast via a SIB.

UE operations in accordance with the present invention will be described. For easy understanding, following terms are defined:

t1: a time at which the RRC connection reject message (can be replaced with RRC connection release message or other message such as SIB) is transmit/received. The RRC connection reject message indicates an eWT T1.

t1+a: a time at which congestion level change or congestion relief is detected.

t1+b (=t2): a time at which the eWT change notification is transmit/received (e.g., via a paging message or a SIB). The eWT change notification indicates an eWT T2. b=Tw+a.

Tw: a time duration from t1+a to t1+b. This time duration corresponds to a wait time for the MME to notify eWT change.

UE 1 may perform RA in consideration of relations between above times:

Option 1 (FIG. 9c)
If T2 is equal to or less than b, UE 1 can perform a new RA without waiting.
If T2 is larger than b, UE 1 should wait (T2−b). That is, UE 1 is not allowed to perform a new RA at least until (T2−b) has passed from t1+b.

Option 2 (FIG. 9d)
If T2 is equal to or less than (b−a), UE 1 can perform a new RA without waiting.
If T2 is larger than (b−a), UE 1 should wait (T2−(b−a)). That is, UE 1 is not allowed to perform a new RA at least until (T2−(b−a)) has passed from t1+b.

In Option 2, the eWT change notification may further includes information indicating at least one of T1+a, a, (b−a) and Tw.

Option 3 (Now Shown)
UE is not allowed to perform a new RA at least until T2 has passed from t1+b.

Options 1~3 assumes scenarios using eWT, but it is also applied to scenarios using EAB information including a wait time (or a barring time). In this case, information corresponding to eWT change notification may be also broadcast to UEs via SIB or unicast to a specific UE via a paging message.

Figure 10A:
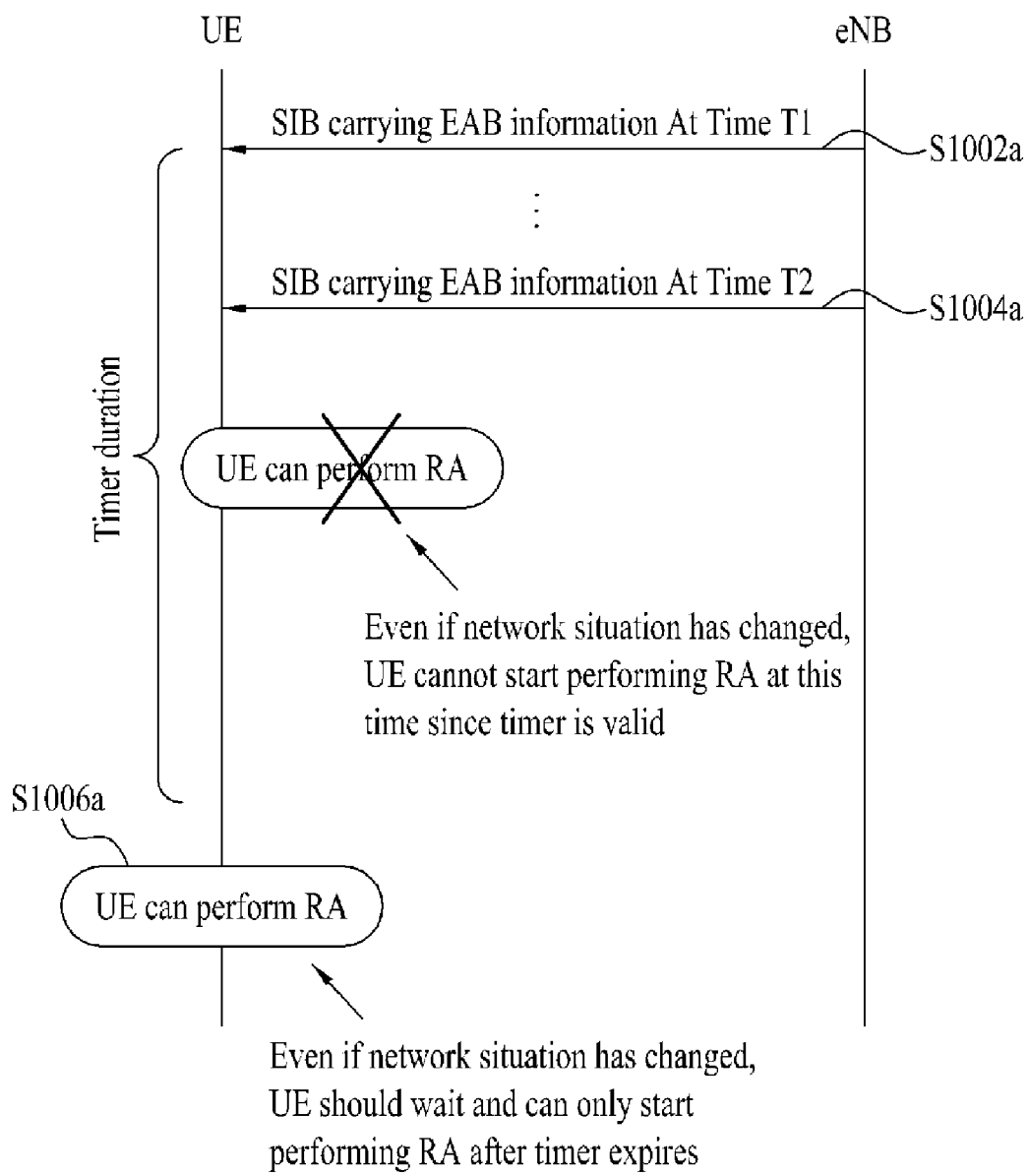
FIGS. 10a~10b illustrate a comparison of User Equipment (UE)'s RA activity.
Figure 10B:
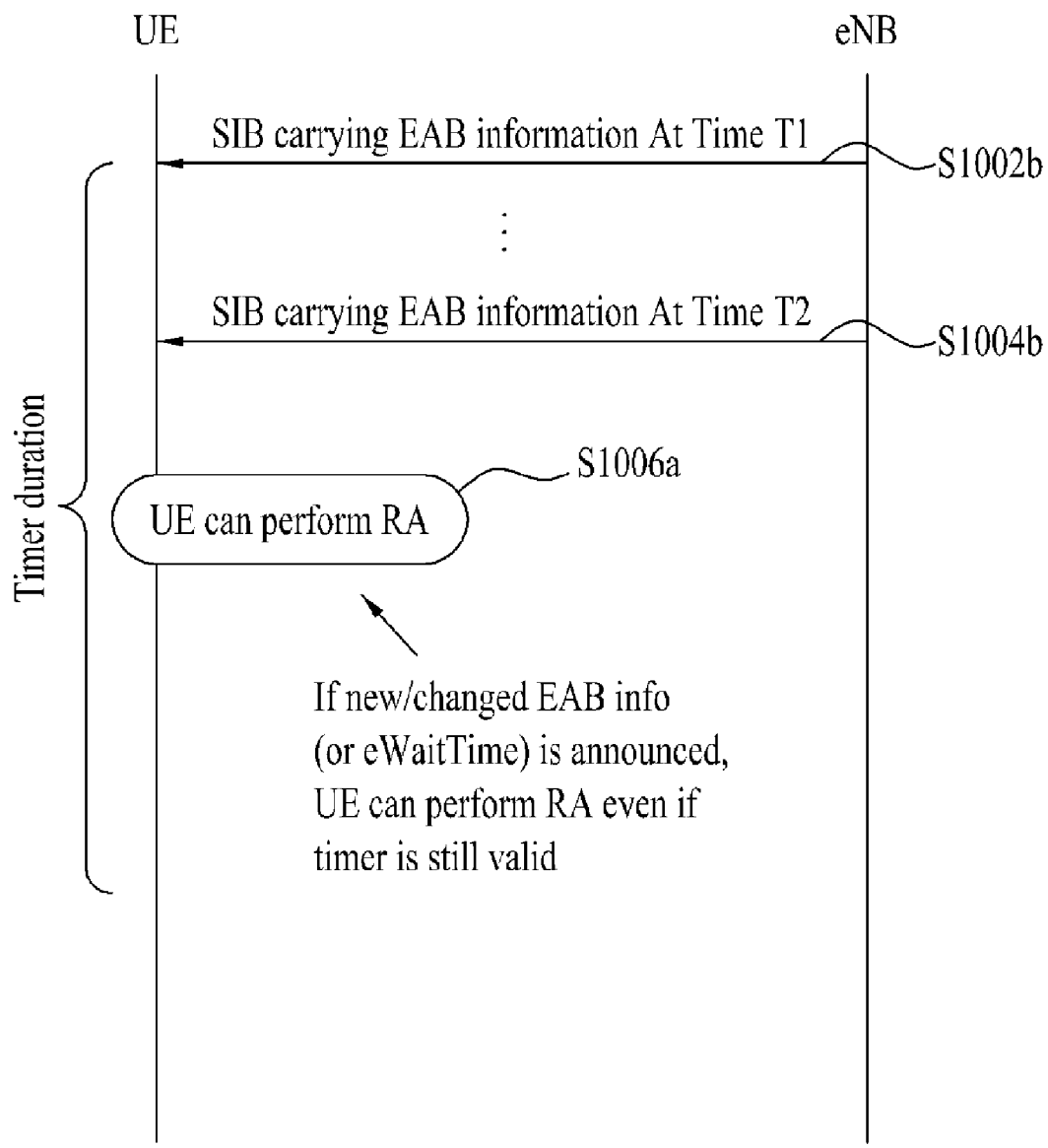

FIGS. 10a~10b illustrate a comparison of UE's RA activity. FIG. 10a shows a RA activity in accordance with a current scheme and FIG. 10b shows a RA activity in accordance with a proposed scheme.

With reference to FIG. 10a, a network (e.g., eNB) broadcasts EAB information (or eWaitTime-related information) via SIB at time t1 (S1002a). EAB information and/or eWaitTime-related information may be transmitted to a specific UE via a paging (not shown). EAB information and/or eWaitTime-related information include time information indicating a time duration which is related to Core Network (CN) congestion control. The time duration is used to setup an EAB timer. If EAB is configured, the UE setup the EAB timer in accordance with the SIB of time t1 and runs the EAB timer. Then, the network may transmit updated/changed EAB information (or eWaitTime-related information) via SIB or paging at time t2 (S1004a). The updated/changed EAB information (or eWaitTime-related information) includes at least one of information indicating congestion level status/change and information indicating a time duration (i.e., wait time) which is related to Core Network (CN) congestion control.

If UE receives new/changed EAB information (or eWaitTime-related information) during the EAB timer runs, the UE can perform a new RA only after the EAB timer expires (S1006a). That is, during the previously configured EAB timer is valid (i.e., runs), UE cannot perform a new RA and should wait until the EAB timer expires even if network situation has changed (i.e., congestion=>non-congestion or low congestion).

With reference to FIG. 10b, most operations are similar to those of FIG. 10a, and thus detailed explanations could refer to those of FIG. 10a. In particular, S1002b and S1004b are corresponding to S1002a and S1004a. Here, differences between the current scheme and the proposed scheme are focused on. As mentioned above, in the current scheme, even if the network situation has changed, UE cannot perform a new RA during the EAB timer is valid. However, in the proposed scheme, if the network situation has changed during the EAB timer runs, UE can perform a new RA by stopping/disregarding the ongoing EAB timer. That is, if new/changed EAB information and/or eWaitTime-related information are received, UE can perform a new RA even if the EAB timer is still valid. The present invention may be interpreted as: the UE shall act so that new/changed EAB information (and/or eWaitTime-related information) has priority over the ongoing EAB timer previously set by the network.

With the examples above, there is no need to perform unnecessary waiting based on old information even if the ongoing timer is valid. This enables to efficiently control network access congestion and to enhance system throughput for MTC services.

FIG. 11 illustrates a block diagram of a UE or Mobile Station (MS) 10. The UE 10 includes a MTC device or a delay-tolerant device. The UE 10 includes a processor (or digital signal processor) 510, RF module 535, power management module 505, antenna 540, battery 555, display 515, keypad 520, memory 530, SIM card 525 (which may be optional), speaker 545 and microphone 550.

A user enters instructional information, such as a telephone number, for example, by pushing the buttons of a keypad 520 or by voice activation using the microphone 550. The microprocessor 510 receives and processes the instructional information to perform the appropriate function, such as to dial the telephone number. Operational data may be retrieved from the Subscriber Identity Module (SIM) card 525 or the memory module 530 to perform the function. Furthermore, the processor 510 may display the instructional and operational information on the display 515 for the user's reference and convenience.

The processor 510 issues instructional information to the RF module 535, to initiate communication, for example, transmits radio signals comprising voice communication data. The RF module 535 comprises a receiver and a transmitter to receive and transmit radio signals. An antenna 540 facilitates the transmission and reception of radio signals. Upon receiving radio signals, the RF module 535 may forward and convert the signals to baseband frequency for processing by the processor 510. The processed signals would be transformed into audible or readable information outputted via the speaker 545, for example. The processor 510 also includes the protocols and functions necessary to perform the various processes described herein.

The aforementioned embodiments are achieved by combination of structural elements and features of the present invention in a predetermined fashion. Each of the structural elements or features should be considered selectively unless specified otherwise. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

The embodiments of the present invention have been described based on data transmission and reception between a BS (or eNB) and a UE. A specific operation which has been described as being performed by the eNB (or BS) may be performed by an upper node of the BS (or eNB) as the case may be. In other words, it will be apparent that various operations performed for communication with the UE in the network which includes a plurality of network nodes along with the BS (or eNB) can be performed by the BS or network nodes other than the BS (or eNB). The BS may be replaced with terms such as fixed station, Node B, eNode B (eNB), and access point. Also, the term UE may be replaced with terms such as mobile station (MS) and mobile subscriber station (MSS).

The embodiments according to the present invention can be implemented by various means, for example, hardware, firmware, software, or combinations thereof. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a module, a procedure, or a function, which performs functions or operations as described above. Software code may be stored in a memory unit and then may be driven by a processor. The memory unit may be located inside or outside the processor to transmit and receive data to and from the processor through various well known means.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention is directed to a network access procedure in a wireless terminal using a Random Access Channel (RACH) and, specifically, to enhancements in the random access procedure of a 3GPP system.

The invention claimed is:

1. A method of performing a random access procedure for network access at a User Equipment (UE) in a wireless communication system, the method comprising:
   receiving a first downlink signal including first information at a time t1, the first information indicating a first time duration T1;
   receiving a second downlink signal including second information at a time t1+b within T1, the second information indicating a second time duration T2; and
   performing the random access procedure for network access,
   wherein b is a time duration taken to receive the second downlink signal after t1,
   wherein if T2 is larger than b, the random access procedure is allowed after T2−b has passed from t1+b,
   wherein if T2 is equal to or less than b, the random access procedure is allowed after t1+b.

2. The method of claim 1, wherein the first downlink signal includes a message for rejecting a radio resource control (RRC) connection request or a message for releasing a RRC connection.

3. The method of claim 1, wherein the first downlink signal includes a system information block, and the first information further indicates whether the random access process is allowed or barred during T1 from t1.

4. The method of claim 1, wherein the network access is for a machine type communication (MTC).

5. The method of claim 1, wherein the UE is a delay-tolerant device.

6. A User Equipment (UE) configured to perform a random access procedure for network access in a wireless communication system, the UE comprising:
   a radio frequency (RF) unit; and
   a processor, wherein the processor is configured to:
   receive a first downlink signal including first information at a time t1, the first information indicating a first time duration T1,
   receive a second downlink signal including second information at a time t1+b within T1, the second information indicating a second time duration T2, and
   perform the random access procedure for network access,
   wherein b is a time duration taken to receive the second downlink signal after t1,
   wherein if T2 is larger than b, the random access procedure is allowed after T2−b has passed from t1+b,
   wherein if T2 is equal to or less than b, the random access procedure is allowed after t1+b.

7. The UE of claim 6, wherein the first downlink signal includes a message for rejecting a radio resource control (RRC) connection request or a message for releasing a RRC connection.

8. The UE of claim 6, wherein the first downlink signal includes a system information block, and the first information further indicates whether the random access process is allowed or barred during T1 from t1.

9. The UE of claim 6, wherein the network access is for a machine type communication (MTC).

10. The UE of claim 6, wherein the UE is a delay-tolerant device.

11. A method of controlling a random access procedure for network access in a wireless communication system, the method comprising:
    transmitting, by a Base Station (BS), a first signal to a User Equipment (UE) at a time t1, the first signal indicating a first time duration T1;
    transmitting, by the BS, a second signal to a Mobility Management Entity (MME), the second signal including identification information of the UE;
    transmitting, by the BS, a third signal to the MME if the BS detects network access congestion relief, the third signal informing the network access congestion relief;
    receiving, by the BS, a fourth signal from the MME, the fourth signal indicating a second time duration T2 for the UE; and
    transmitting, by the BS, a fifth signal to the UE at a time t1+b, the fifth signal indicating the second time duration T2,
    wherein b is a time duration taken to receive the second downlink signal after t1,
    wherein if T2 is larger than b, the UE is allowed to perform the random access procedure after T2−b has passed from t1+b,
    wherein if T2 is equal to or less than b, the UE is allowed to perform the random access procedure after t1+b.

12. The method of claim 11, wherein the first signal includes a message for rejecting a radio resource control (RRC) connection request or a message for releasing a RRC connection.

13. The method of claim 11, wherein the first signal includes a system information block, and the first signal further indicates whether the random access process is allowed or barred during T1 from t1.

14. The method of claim 11, wherein the network access is for a machine type communication (MTC).

15. The method of claim 11, wherein the UE is a delay-tolerant device.

16. A wireless communication system configured to control a random access procedure for network access, the wireless communication system comprising:
    a User Equipment (UE);
    a Base Station (BS); and
    a Mobility Management Entity (MME),
    wherein the BS is configured to:
    transmit a first signal to a User Equipment (UE) at a time t1, the first signal indicating a first time duration T1,
    transmit a second signal to the MME, the second signal including identification information of the UE,
    transmit a third signal to the MME if the BS detects network access congestion relief, the third signal informing the network access congestion relief,
    receive a fourth signal from the MME, the fourth signal indicating a second time duration T2 for the UE, and
    transmit a fifth signal to the UE at a time t1+b, the fifth signal indicating the second time duration T2,
    wherein b is a time duration taken to receive the second downlink signal after t1,
    wherein if T2 is larger than b, the UE is allowed to perform the random access procedure after T2−b has passed from t1+b, wherein if T2 is equal to or less than b, the UE is allowed to perform the random access procedure after t1+b.

17. The wireless communication system of claim 16, wherein the first signal includes a message for rejecting a radio resource control (RRC) connection request or a message for releasing a RRC connection.

18. The wireless communication system of claim 16, wherein the first signal includes a system information block, and the f first signal further indicates whether the random access process is allowed or barred during T1 from t1.

19. The wireless communication system of claim 16, wherein the network access is for a machine type communication (MTC).

20. The wireless communication system of claim 16, wherein the UE is a delay-tolerant device.

* * * * *